(12) United States Patent
Gomadam et al.

(10) Patent No.: US 9,166,729 B2
(45) Date of Patent: Oct. 20, 2015

(54) ENHANCED DEMODULATION REFERENCE SIGNAL (DM-RS) DESIGN

(75) Inventors: Krishna Srikanth Gomadam, Santa Clara, CA (US); Yakun Sun, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 304 days.

(21) Appl. No.: 13/610,908

(22) Filed: Sep. 12, 2012

(65) Prior Publication Data

US 2013/0155921 A1    Jun. 20, 2013

Related U.S. Application Data

(60) Provisional application No. 61/570,769, filed on Dec. 14, 2011.

(51) Int. Cl.
| | |
|---|---|
| *H04K 1/02* | (2006.01) |
| *H04L 25/02* | (2006.01) |
| *H04B 7/02* | (2006.01) |
| *H04B 7/04* | (2006.01) |

(52) U.S. Cl.
CPC .............. *H04K 1/02* (2013.01); *H04L 25/0226* (2013.01); *H04B 7/024* (2013.01); *H04B 7/0452* (2013.01)

(58) Field of Classification Search
CPC .............................. H04W 84/18; H04W 84/12
See application file for complete search history.

(56) References Cited

U.S. PATENT DOCUMENTS

| | | | | |
|---|---|---|---|---|
| 8,300,587 | B2 * | 10/2012 | Chmiel et al. | 370/329 |
| 8,923,249 | B2 * | 12/2014 | Kim et al. | 370/335 |
| 2007/0147333 | A1 | 6/2007 | Makhijani | |
| 2009/0190687 | A1 | 7/2009 | Moon et al. | |
| 2009/0268630 | A1 | 10/2009 | Yellin et al. | |
| 2010/0008445 | A1 | 1/2010 | Khan | |
| 2010/0271968 | A1 | 10/2010 | Liu et al. | |

(Continued)

FOREIGN PATENT DOCUMENTS

| | | |
|---|---|---|
| WO | 2011021852 A2 | 2/2001 |
| WO | 2011097523 A1 | 8/2011 |

(Continued)

OTHER PUBLICATIONS

Zhang et al., U.S. Appl. No. 61/558,405, filed Nov. 10, 2011.

(Continued)

*Primary Examiner* — Hassan Phillips
*Assistant Examiner* — Prenell Jones

(57) ABSTRACT

A method in a mobile communication terminal includes receiving a Multi-User Multiple-Input Multiple-Output (MU-MIMO) signal, which includes at least a precoded transmission that is addressed to the terminal and which includes one or more Demodulation Reference Signals (DM-RS). Control information, which indicates one or more scrambling sequences and one or more orthogonalization sequences used in producing the DM-RS, is received in the mobile communication terminal. The control information is provided in a format that does not permit signaling of every possible scrambling sequence and orthogonalization sequence selection. The control information is interpreted in the mobile communication terminal so as to identify the scrambling sequences and orthogonalization sequences used in producing the DM-RS, and the DM-RS are demodulated using the identified scrambling sequences and orthogonalization sequences.

20 Claims, 2 Drawing Sheets

(56) References Cited

U.S. PATENT DOCUMENTS

| | | | |
|---|---|---|---|
| 2010/0272032 A1 | 10/2010 | Sayana et al. | |
| 2010/0303034 A1* | 12/2010 | Chen et al. | 370/329 |
| 2010/0322171 A1 | 12/2010 | Dekorsy et al. | |
| 2010/0322351 A1 | 12/2010 | Tang et al. | |
| 2011/0032838 A1 | 2/2011 | Liu et al. | |
| 2011/0034175 A1 | 2/2011 | Fong et al. | |
| 2011/0038310 A1* | 2/2011 | Chmiel et al. | 370/328 |
| 2011/0243066 A1* | 10/2011 | Nayeb Nazar et al. | 370/328 |
| 2011/0268007 A1 | 11/2011 | Barany et al. | |
| 2011/0273994 A1* | 11/2011 | Lin | 370/241 |
| 2011/0274063 A1* | 11/2011 | Li | 370/329 |
| 2012/0051265 A1 | 3/2012 | Shen et al. | |
| 2012/0106595 A1* | 5/2012 | Bhattad et al. | 375/146 |
| 2013/0034064 A1* | 2/2013 | Nam et al. | 370/329 |
| 2013/0039332 A1* | 2/2013 | Nazar et al. | 370/330 |
| 2013/0039349 A1 | 2/2013 | Mahalleh et al. | |
| 2013/0114427 A1 | 5/2013 | Maattanen et al. | |
| 2013/0114430 A1 | 5/2013 | Koivisto et al. | |
| 2014/0056156 A1 | 2/2014 | Jongren | |

FOREIGN PATENT DOCUMENTS

| | | | |
|---|---|---|---|
| WO | 2011114079 A1 | 9/2011 | |
| WO | 2011119140 A2 | 9/2011 | |

OTHER PUBLICATIONS

Gomadam et al., U.S. Appl. No. 13/733,150, filed Jan. 3, 2013.

3GPP TR 36.819, "Technical Specification Group Radio Access Network; Coordinated multi-point operation for LTE physical layer aspects (release 11)", V11.0.0, Sep. 2011.

3GPP TS 36.211, "Technical Specification Group Radio Access Network; Evolved Universal Terrestrial Radio Access (E-UTRA); Physical Channels and Modulation (release 10)", V10.3.0, Sep. 2011.

3GPP TS 36.212, "Technical Specification Group Radio Access Network; Evolved Universal Terrestrial Radio Access (E-UTRA); Multiplexing and channel coding (release 10)", V10.3.0, Sep. 2011.

U.S. Appl. No. 13/719,241, filed Dec. 19, 2012.

International Application PCT/IB2012/057248 Search Report dated May 8, 2013.

International Application PCT/IB2012/057455 Search Report dated May 13, 2013.

U.S. Appl No. 13/719,241, Office Action dated Jul. 25, 2014.

U.S. Appl. No. 13/719,241 Office Action dated Mar. 18, 2015.

* cited by examiner

ENHANCED DEMODULATION REFERENCE SIGNAL (DM-RS) DESIGN

CROSS-REFERENCE TO RELATED APPLICATIONS

This application claims the benefit of U.S. Provisional Patent Application 61/570,769, filed Dec. 14, 2011, whose disclosure is incorporated herein by reference.

FIELD OF THE DISCLOSURE

The present invention relates generally to communication systems, and particularly to the use of reference signals in wireless communication systems.

BACKGROUND

In some communication systems, base stations transmit beam-formed transmissions to communication terminals by applying a precoding operation to the signals prior to transmission. In addition, the base stations transmit Reference Signals (RS) to the terminals, for example in order to enable the terminals to estimate the response of the communication channel.

Precoding and RS transmission are used, for example, in Evolved Universal Terrestrial Radio Access (E-UTRA) systems, also referred to as Long Term Evolution (LTE) or LTE-Advanced (LTE-A). Precoding and RS transmission for E-UTRA are specified, for example, in "3$^{rd}$ Generation Partnership Project; Technical Specification Group Radio Access Network; Evolved Universal Terrestrial Radio Access (E-UTRA); Physical Channels and Modulation (Release 10)," 3GPP TS 36.211, version 10.3.0, September, 2011; and in "3$^{rd}$ Generation Partnership Project; Technical Specification Group Radio Access Network; Evolved Universal Terrestrial Radio Access (E-UTRA); Multiplexing and channel coding (Release 10)," 3GPP TS 36.212, version 10.3.0, September, 2011, which are incorporated herein by reference.

The description above is presented as a general overview of related art in this field and should not be construed as an admission that any of the information it contains constitutes prior art against the present patent application.

SUMMARY

An embodiment that is described herein provides a method in a mobile communication terminal. The method includes receiving a Multi-User Multiple-Input Multiple-Output (MU-MIMO) signal, which includes at least a precoded transmission that is addressed to the terminal and which includes one or more Demodulation Reference Signals (DM-RS). Control information, which indicates one or more scrambling sequences and one or more orthogonalization sequences used in producing the DM-RS, is received in the mobile communication terminal. The control information is provided in a format that does not permit signaling of every possible scrambling sequence and orthogonalization sequence selection. The control information is interpreted in the mobile communication terminal so as to identify the scrambling sequences and orthogonalization sequences used in producing the DM-RS, and the DM-RS are demodulated using the identified scrambling sequences and orthogonalization sequences.

In some embodiments the method includes estimating, using the demodulated DM-RS, a response of a communication channel used for transmitting the precoded transmission. In an embodiment, receiving the control information includes receiving an indication of a subset of the orthogonalization sequences, which has been selected from an overall set of the orthogonalization sequences for use in producing the DM-RS, and interpreting the control information includes deriving the subset of the orthogonalization sequences from the indication.

In a disclosed embodiment, receiving the control information includes receiving a single indication that indicates the scrambling sequences and orthogonalization sequences used in producing the DM-RS for two different transmission ranks, and interpreting the control information includes applying the entire indication for one of the ranks, and applying a part of the indication for the other of the ranks.

In another embodiment, receiving the control information includes receiving a single indication that indicates the scrambling sequences and orthogonalization sequences used in producing the DM-RS for a first transmission rank, and interpreting the control information includes applying only a part of the indication for a second transmission rank, lower than the first transmission rank. In an embodiment, the method includes receiving data transmission on resource elements associated with a remaining part of the single indication.

In yet another embodiment, receiving the control information includes receiving an index that indicates a respective combination of the scrambling sequences and the orthogonalization sequences, and interpreting the control information includes identifying the scrambling sequences and orthogonalization sequences used in producing the DM-RS based on the index. In still another embodiment, receiving the control information includes accepting the control information in compressed form, and interpreting the control information includes decompressing the compressed form so as to identify the scrambling sequences and orthogonalization sequences used in the DM-RS.

In some embodiments, receiving the control information includes receiving one or more port indices that are indicative of the orthogonalization sequences. In some embodiments, receiving the control information comprises receiving an indication of a given scrambling sequence that is used with two or more of the orthogonalization sequences in producing the DM-RS.

There is additionally provided, in accordance with an embodiment that is described herein, apparatus including a receiver and processing circuitry. The receiver is configured to receive a Multi-User Multiple-Input Multiple-Output (MU-MIMO) signal including at least a precoded transmission that is addressed to the terminal and which includes one or more Demodulation Reference Signals (DM-RS), and to further receive control information, which indicates one or more scrambling sequences and one or more orthogonalization sequences used in producing the DM-RS, wherein the control information is provided in a format that does not permit signaling of every possible scrambling sequence and orthogonalization sequence selection. The processing circuitry is configured to interpret the control information so as to identify the scrambling sequences and orthogonalization sequences used in producing the DM-RS, and to demodulate the DM-RS using the identified scrambling sequences and orthogonalization sequences.

In some embodiments, a mobile communication terminal includes the disclosed apparatus. In some embodiments, a chipset for processing signals in a mobile communication terminal includes the disclosed apparatus.

BRIEF DESCRIPTION OF THE DRAWINGS

The present disclosure will be more fully understood from the following detailed description of the embodiments thereof, taken together with the drawings in which.

DETAILED DESCRIPTION OF EMBODIMENTS

Embodiments that are described herein provide improved methods and systems for transmitting, reporting and measuring Demodulation Reference Signals (DM-RS) in communication systems. In some embodiments, one or more cells transmit a Multi-User Multiple-Input Multiple-Output (MU-MIMO) signal. Typically, although not necessarily, the MU-MIMO signal is transmitted by two or more cells that cooperate with one another using Cooperative Multipoint (CoMP) transmission.

Each precoded transmission comprises one or more DM-RS, which are terminal-specific and enable the terminal to estimate the response of the communication channel and calculate channel feedback. Since the MU-MIMO signal typically comprises multiple precoded transmissions addressed to multiple terminals, it is important to maximize the orthogonality between different DM-RS, in order to reduce interference in DM-RS measurement in the terminal. Typically, each DM-RS comprises a scrambling sequence multiplied by an orthogonalization sequence. The scrambling and orthogonalization sequences are selected from respective predefined sets of sequences, in an embodiment.

The cells typically transmit to the terminals control information, which notify each terminal of the scrambling and orthogonalization sequences used in producing its DM-RS. In E-UTRA systems, for example, the control information is typically transmitted in Downlink Control Information (DCI) messages.

In order to reduce signaling overhead, the control information is provided in compressed form, i.e., in a format that does not permit signaling of every possible scrambling sequence and orthogonalization sequence selection. Upon receiving the control information, the terminal interprets the control information so as to identify the scrambling sequences and orthogonalization sequences used in producing the DM-RS. The terminal then demodulates the DM-RS using the identified scrambling sequences and orthogonalization sequences.

Several examples of efficient formats, which enable signaling of DM-RS configurations with small overhead, are described herein. Because of the small overhead incurred by the disclosed techniques, such example techniques enable the cells and terminals to use large numbers of scrambling and orthogonalization sequences. As such, the disclosed techniques are highly scalable and enable grouping large numbers of terminals for MU-MIMO transmission.

Figure 1:
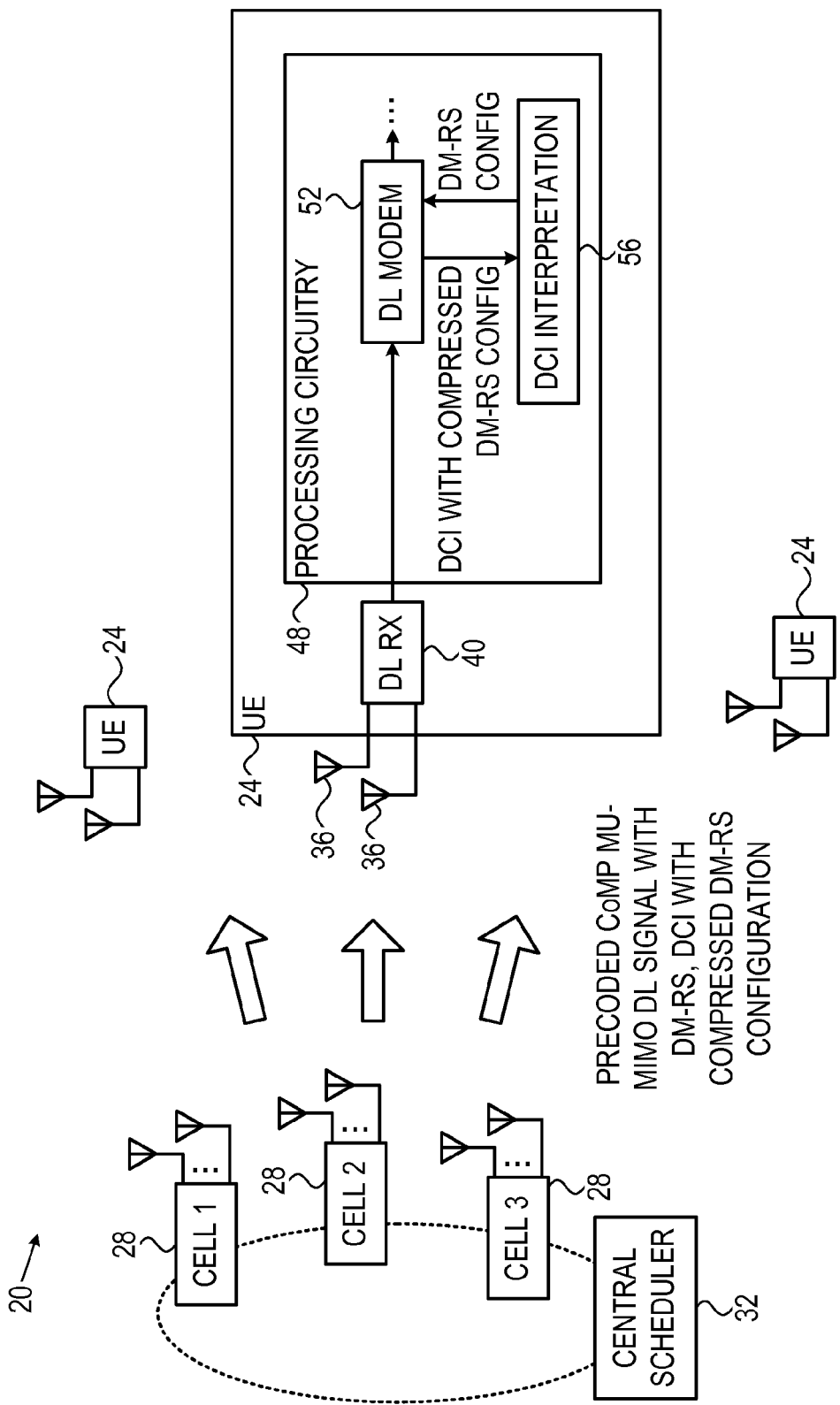
FIG. 1 is a block diagram that schematically illustrates a Cooperative Multipoint (CoMP) communication system that uses Multi-User Multiple-Input Multiple-Output (MU-MIMO) transmission, in accordance with an embodiment that is described herein.

FIG. 1 is a block diagram that schematically illustrates a Cooperative Multipoint (CoMP) communication system 20 that uses Multi-User Multiple-Input Multiple-Output (MU-MIMO) transmission, in accordance with an embodiment that is described herein. In the present example, system 20 operates in accordance with Third Generation Partnership Project (3GPP) Long Term Evolution-Advanced (LTE-A) specifications. In alternative embodiments, system 20 may operate in accordance with any other suitable communication protocol in which cells coordinate transmission with one another, such as WiMAX and 3GPP2, for example.

In the embodiment of FIG. 1, system 20 comprises multiple mobile communication terminals 24 (referred to in LTE-A terminology as User Equipment—UE) and three cells 28 (base stations) denoted CELL1, CELL2 and CELL3. The terms cell and base station are used interchangeably herein. This choice of three cells is made, however, purely by way of example. In real-life configurations, system 20 typically comprises a large number of cells, some of which may be collocated, and a large number of terminals. Each UE 24 may comprise, for example, a cellular phone, a wireless-enabled computing device or any other suitable type of communication terminal.

Cells 28 cooperate with one another in transmitting precoded (i.e., beamformed) MU-MIMO signals to UEs 24. The disclosed techniques can be used with various CoMP modes, such as Joint Processing (JP), Cooperative Beamforming (CB) and Dynamic Point Selection (DPS). A group of cells that cooperate in this manner is referred to as a cooperating set.

Regardless of the CoMP mode being used, from the point of view of a given UE, the UE receives a downlink (DL) signal, transmitted from one or more of the cells, which carries one or more precoded transmissions that are transmitted simultaneously. One or more of these transmissions are addressed to the UE, while one or more other transmissions may be addressed to other UEs. Cells 28 may transmit to a given UE either a single precoded transmission or multiple precoded transmissions in the same MU-MIMO signal. The number of precoded transmissions transmitted simultaneously to a given UE is referred to as a transmission rank. Each precoded transmission to a given UE is also referred to as a layer.

In the present embodiment, system 20 comprises a central scheduler 32, which schedules the transmissions of the various cells to the various UEs, and calculates precoding vectors (i.e., sets of complex weights to be applied to the signals transmitted via the respective transmit antennas of the cells) to be applied by the cells when transmitting the CoMP transmissions. Central scheduler 32 typically calculates the precoding vectors based on channel feedback that is received from the UEs.

Typically, each precoded transmission comprises respective Demodulation Reference Signals (DM-RS), which are precoded using the same precoding vector as the rest of the transmission. Each UE 24 produces its channel feedback by demodulating the DM-RS of its designated transmissions, and uses the demodulated DM-RS for estimating the communication channel from the cells to the UE. When multiple transmissions are addressed to the same UE (i.e., rank>1), each transmission comprises a different DM-RS, and the UE estimates the channel response for the multiple transmissions by processing the respective DM-RS.

In order to enable each UE to demodulate its designated DM-RS with minimal interference from other DM-RS, central scheduler 32 typically assigns different DM-RS to different precoded transmissions in the MU-MIMO signal. The central scheduler typically attempts to maximize the orthogonality between different DM-RS in order to minimize the interference. Cells 28 typically transmit signaling information to the UEs, which signaling information informs each UE of the DM-RS configuration used in its designated transmissions. In LTE and LTE-A systems, for example, the DM-RS configuration may be transmitted in Downlink Control Information (DCI) messages.

In various embodiments, cells 28 use different techniques for reducing the signaling overhead incurred by reporting the DM-RS configurations to UEs 24 in the DCI messages. In the disclosed embodiments, cells transmit the DM-RS configuration in compressed form, i.e., in a format that does not permit transmission of every possible selection of DM-RS configuration. The UEs are configured to interpret the compressed DM-RS configurations, and reconstruct their respective DM-RS. Several example signaling schemes are described in detail below.

In the embodiment of FIG. 1, UE 24 comprises one or more antennas 36, a downlink receiver 40, and processing circuitry 48. (The internal UE structure is shown only for one of the UEs, for the sake of clarity. Generally, however, other UEs have a similar structure.) Receiver 40 receives downlink signals from cells 28 via antennas 36. Processing circuitry 48 processes the received signals. Among other tasks, processing circuitry 48 demodulates the DM-RS in the transmissions addressed to the UE, estimates the channel response using the demodulated DM-RS, and computes channel feedback to be fed-back to cells 28. The feedback is typically transmitted by an uplink transmitter (not shown in the figure).

In some embodiments, processing circuitry 48 comprises a downlink modem 52, which demodulates the transmissions addressed to the UE and performs other tasks such as channel estimation and feedback calculations. Modem 52 forwards the received DCI messages to a DCI interpretation unit 56. The DCI messages, as explained above, comprise the DM-RS configuration for the UE in compressed form. DCI interpretation unit 56 interprets (e.g., decompresses) the DM-RS configuration, and returns the applicable DM-RS format to modem 52. Modem 52 uses the DM-RS format to demodulate the DM-RS, and then estimates the channel and computes the channel feedback. Several example DM-RS formats and compression schemes are described below.

The UE configuration shown in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, and processing circuitry 48, are implemented in hardware, such as implementing receiver 40 using one or more Radio Frequency Integrated Circuits (RFICs), or implementing processing circuitry 48 using one or more Field-Programmable Gate Arrays (FPGAs) or Application-Specific Integrated Circuits (ASICs). In alternative embodiments, certain elements of UE 24 are implemented in software, or using a combination of hardware and software elements.

In some embodiments, certain UE elements, such as certain elements of processing circuitry 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In some embodiments, each DM-RS comprises a certain scrambling sequence multiplied by a certain orthogonalization sequence. The scrambling sequences are identified by respective scrambling IDs denoted nSCID, and the orthogonalization sequences are identified by respective port numbers. Thus, the terms "scrambling sequences," "scrambling IDs" and nSCID are used interchangeably. Similarly, the terms "orthogonalization sequences" and "ports" are used interchangeably. Thus, the total number of different DM-RS is the number of scrambling sequences multiplied by the number of ports. This total number of different DM-RS defines the maximum number of UEs that can be grouped together for MU-MIMO transmission.

In various embodiments, the DM-RS may be defined in different ways. In LTE Release 10, for example, the DM-RS sequences (referred to as UE-specific RS) are defined in section 6.10.3 of 3GPP TS 36.211, cited above. This definition considers two orthogonal ports (denoted ports 7 and 8) and two scrambling IDs (denoted nSCID=0 or 1), to support a maximum of four UEs that can be grouped together for MU transmission.

In an example embodiment, the DM-RS in system 20 are calculated using the equations given in 3GPP TS 36.211, but with the range of nSCID extended to multiple bits (e.g., two bits—giving four possible nSCIDs). In this example embodiment, the generation of the DM-RS sequences is initialized with:

$$c_{init}=(\lfloor n_s/2 \rfloor+1)(2X_{cellid}+1)2^{16}+n_{SCID} \qquad \text{Equation 1}$$

wherein $n_s$ denotes the slot number in the radio frame, $X_{cellid}$ is derived from the cell ID, and $n_{SCID}$ has more than one bit, e.g., two bits.

In an alternative embodiment, the initialization is defined so as to maintain orthogonality among UEs associated with the same cooperating set:

$$c_{init}=(\lfloor n_s/2 \rfloor+1)(2X_{TS}+1)2^{16}+n_{SCID} \qquad \text{Equation 2}$$

wherein $X_{TS}$ is derived from the identity of the cooperating set.

In another alternative embodiment, the initialization is UE-specific:

$$c_{init}=(\lfloor n_s/2 \rfloor+1)(2X_{UE}+1)2^{16}+n_{SCID} \qquad \text{Equation 3}$$

wherein $X_{UE}$ is derived from the Radio Network Temporary Identifier (RNTI) of the UE. Further alternatively, the DM-RS may be defined in any other suitable way.

As explained above, cells 28 typically notify each UE 24 of the DM-RS configuration being used in its downlink transmissions, by transmitting Downlink Control Information (DCI) messages to the UEs. The DM-RS configuration of a UE indicates, per layer, the scrambling sequence (nSCID) and orthogonalization sequence (port) used in producing the DM-RS.

When the total number of possible DM-RS sequences is large, however, a large number of bits is needed in the DCI messages in order to report the DM-RS. The signaling overhead incurred by the DCI messages may become prohibitive.

In some embodiments that are described in detail below, cells 28 transmit the DM-RS configuration in compressed or jointly-coded form, i.e., in a format that does not permit transmission of every possible selection of scrambling sequence and orthogonalization sequence. By using such a format, the DM-RS configurations can be reported using a relatively small number of DCI message bits. In each UE 24, DCI interpretation module 56 is aware of the compressed format, and is able to interpret the DCI and recover the actual DM-RS configuration used for transmitting to the UE.

Figure 2:
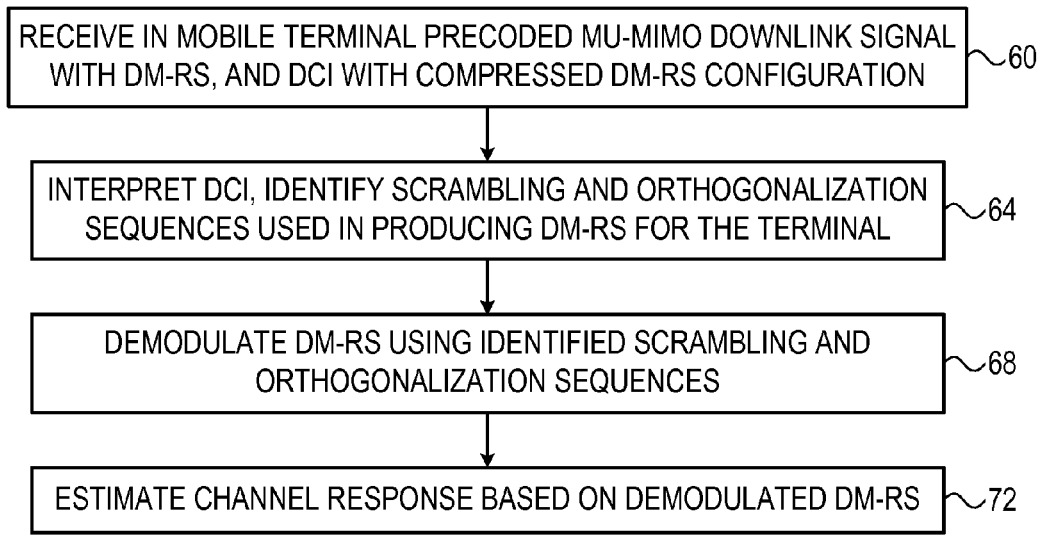
FIG. 2 is a flow chart that schematically illustrates a method for decoding Demodulation Reference Signals (DM-RS), in accordance with an embodiment that is described herein.

FIG. 2 is a flow chart that schematically illustrates a method for decoding Demodulation Reference Signals (DM-RS) in UE 24, in accordance with an embodiment that is described herein. The method begins with downlink receiver 40 of UE 24 receiving a CoMP MU-MIMO downlink signal from cells 28, at a reception operation 60. Downlink modem 52 of the UE extracts the DCI messages from the received signal and provides them to DCI interpretation module 56.

DCI interpretation module 56 interprets the DCI messages, e.g., decompresses the DCI message format, in an interpretation operation 64. Module 56 thus identifies, per layer, the scrambling sequence and orthogonalization sequence used in producing the DM-RS. Module 56 indicates the identified scrambling and orthogonalization sequences to modem 52.

Modem 52 demodulates the DM-RS using the scrambling and orthogonalization sequences indicated by DCI interpretation module 56, at a DM-RS demodulation operation 68. Modem 52 then estimates the response of the communication channel using the demodulated DM-RS, at a channel estimation operation 72. The estimated channel can be used, for example, for calculating channel feedback.

In various embodiments, the DM-RS may be formatted in various ways in order to reduce the number of DCI bits. In the examples given below, each DM-RS configuration is formatted using a total of four bits. Generally, however, any other suitable format having any suitable number of bits can be used.

In some embodiments, the complete set of orthogonalization sequences (ports) is divided into two or more subsets. The subsets are not necessarily disjoint, i.e., some ports may appear in multiple subsets. In these embodiments, each UE is assigned a certain respective subset of the ports. (The number of ports assigned to a UE depends on the transmission rank to that UE).

When using this technique, the DCI message informs each UE of the subset of ports assigned to its DM-RS, instead of having to indicate each individual port. This feature reduces the number of bits considerably, especially for high-rank transmission such as rank=4. Upon receiving the DCI message, DCI interpretation module 56 in the UE derives the actual orthogonalization sequences from the subset indication.

Figure 3:
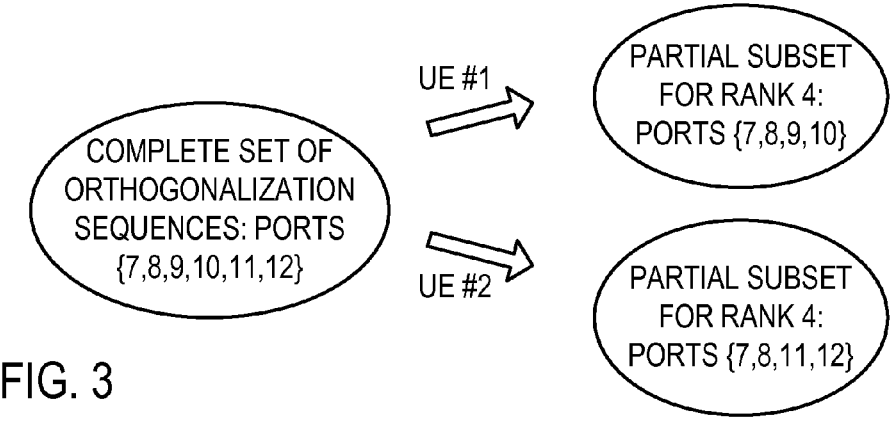
FIG. 3 is a diagram that schematically illustrates a method for assigning DM-RS, in accordance with an embodiment that is described herein.

FIG. 3 is a diagram that schematically illustrates a method for assigning DM-RS, in accordance with an embodiment that is described herein. The figure demonstrates the use of subsets of orthogonalization sequences. In the example seen, the complete set of orthogonalization sequences comprises the set of ports {7, 8, 9, 10, 11, 12}. A certain UE, denoted UE#1, is assigned the subset of ports {7, 8, 9, 10}. Another UE, denoted UE#2, is assigned the subset of ports {7, 8, 11, 12}. Note that ports 7 and 8 are common to both assignments. In alternative embodiments, UEs may be assigned respective subsets of orthogonalization sequences in any other suitable way.

In some embodiments, the reduction in DCI message overhead is achieved by using a mechanism referred to as "zero-power DM-RS" or "muted DM-RS." In these embodiments, multiple UEs are assigned a certain high-rank group of orthogonalization ports, but each of the UEs actually measures only a certain subset of the ports in the group. The other ports are regarded by the UE as zero-power DM-RS. (The term "rank" refers to the number of precoded transmissions sent simultaneously to the UE.)

Consider, for example, two UEs denoted UE#1 and UE#2. Both UE#1 and UE#2 are assigned the same overall group of ports {7, 8, 9, 10}. UE#1, however, only measures ports {7, 8} and regards ports {9, 10} as zero-power DM-RS. UE#2 does the opposite, i.e., only measures ports {9, 10} and regards ports {7, 8} as zero-power DM-RS. In each UE, DCI interpretation module 56 is aware of the overall group of ports, and is also aware of which of the ports are to be regarded as zero-power ports. Thus, module 56 is able to identify the actual orthogonalization sequences to be measured by the UE.

In some embodiments, the cells transmit a high-rank DM-RS configuration. The UE uses the entire high-rank DM-RS configuration for high-rank transmissions, and a part of the DM-RS configuration for low-rank transmissions. Using this technique, for example, a given UE may use a rank-4 DM-RS configuration for both rank-4 and rank-2 reception.

In some embodiments, when using the zero-power DM-RS technique, central scheduler 32 schedules data transmission to a given UE in the Resource Elements (RE) corresponding to the zero-power DM-RS of that UE. In LTE or LTE-A, for example, the data transmissions comprise Physical Downlink Shared Channels (PDSCH). In the above scenario, for example, scheduler 32 may schedule data transmissions to UE#1 in the REs mapped to ports {9, 10}, and to UE#2 in the REs mapped to ports {7, 8}.

Figure 4:
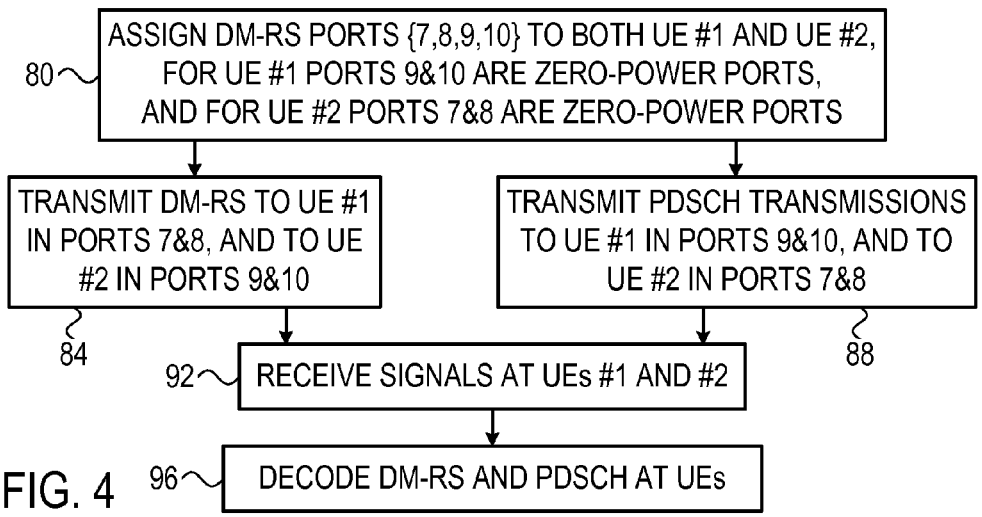
FIG. 4 is a flow chart that schematically illustrates a method for DM-RS assignment, transmission and reception, in accordance with an embodiment that is described herein.

FIG. 4 is a flow chart that schematically illustrates a method for DM-RS assignment, transmission and reception, in accordance with an embodiment that is described herein. The description that follows refers to certain assignments of DM-RS ports. These assignments, however, are chosen purely by way of example. In alternative embodiments, any other suitable port assignments can be used.

The method of FIG. 4 begins with central scheduler 32 assigning DM-RS ports to UE#1 and UE#2, at a port assignment operation 80. In this example, scheduler 32 assigns ports {7, 8, 9, 10} to both UE#1 and UE#2, such that for UE#1 ports {9, 10} are zero-power ports, and for UE#2 ports {7, 8} are zero-power ports.

Scheduler 32 schedules transmission of DM-RS to UE#1 in ports {7, 8} and to UE#2 in ports {9, 10}, at a DM-RS transmission operation 84. At the same time, scheduler 32 schedules transmission of data (PDSCH) to UE#1 in ports {9, 10} and to UE#2 in ports {7, 8}, at a data transmission operation 88. Cells 28 transmit MU-MIMO signals that carry the DM-RS and PDSCH in the appropriate REs in accordance with this scheduling.

Downlink receivers 40 of UE#1 and UE#2 receive the MU-MIMO signals, at a signal reception operation 92. Processing circuitry 48 in each UE decodes the DM-RS and PDSCH, at a decoding operation 96.

In some embodiments, the DCI messages convey a four-bit index that indicates the DM-RS configuration. This reporting mechanism can also be viewed as a compressed form of signaling, because the sixteen values of the four-bit index cannot indicate every possible selection of scrambling and orthogonalization sequence. DCI interpretation module 56 in the UE is aware of this signaling convention, and is thus able to receive an index and derive the actual scrambling and orthogonalization sequences from the received index.

The following tables give several examples of such a signaling mechanism. Each table gives the mapping of indices to DM-RS configurations for the cases of one enabled Code Word (CW) and two enabled CW. In alternative embodiments, any other suitable mapping of indices to DM-RS configuration can be used.

TABLE 1

Four orthogonalization ports, two SCIDs

| 4-bit index | DM-RS configuration, one CW enabled | DM-RS configuration, two CW enabled |
| --- | --- | --- |
| 0 | 1 layer port 7, SCID = 0 | 2 layers ports 7-8, SCID = 0 |
| 1 | 1 layer port 7, SCID = 1 | 2 layers ports 7-8, SCID = 1 |
| 2 | 1 layer port 8, SCID = 0 | 2 layers ports 9-10, SCID = 0 |
| 3 | 1 layer port 8, SCID = 1 | 2 layers ports 9-10, SCID = 1 |
| 4 | 1 layer port 9, SCID = 0 | 3 layers ports 7-9, SCID = 0 |
| 5 | 1 layer port 9, SCID = 1 | 3 layers ports 7-9, SCID = 1 |
| 6 | 1 layer port 10, SCID = 0 | 3 layers ports 8-10, SCID = 0 |
| 7 | 1 layer port 10, SCID = 1 | 3 layers ports 8-10, SCID = 1 |
| 8 | 2 layers ports 7-8, SCID = 0 | 4 layers ports 7-10, SCID = 0 |
| 9 | 2 layers ports 7-8, SCID = 1 | 4 layers ports 7-10, SCID = 1 |
| 10 | 2 layers ports 9-10, SCID = 0 | 5 layers ports 7-11 |
| 11 | 2 layers ports 9-10, SCID = 1 | 6 layers ports 7-12 |
| 12 | 3 layers, ports 7-9 | 7 layers ports 7-13 |
| 13 | 4 layers, ports 7-10 | 8 layers ports 7-14 |
| 14 | Reserved | Reserved |
| 15 | Reserved | Reserved |

TABLE 2

Four orthogonalization ports, two SCIDs, smaller overhead

| 4-bit index | DM-RS configuration, one CW enabled | DM-RS configuration, two CW enabled |
| --- | --- | --- |
| 0 | 1 layer port 7, SCID = 0 | 2 layers ports 7-8, SCID = 0 |
| 1 | 1 layer port 7, SCID = 1 | 2 layers ports 7-8, SCID = 1 |
| 2 | 1 layer port 8, SCID = 0 | 2 layers ports 11-12, SCID = 0 |
| 3 | 1 layer port 8, SCID = 1 | 2 layers ports 11-12, SCID = 1 |
| 4 | 1 layer port 11, SCID = 0 | 3 layers ports 7-9, SCID = 0 |
| 5 | 1 layer port 11, SCID = 1 | 3 layers ports 7-9, SCID = 1 |
| 6 | 1 layer port 12, SCID = 0 | 3 layers ports 8-10, SCID = 0 |
| 7 | 1 layer port 12, SCID = 1 | 3 layers ports 8-10, SCID = 1 |
| 8 | 2 layers ports 7-8, SCID = 0 | 4 layers ports 7-10, SCID = 0 |
| 9 | 2 layers ports 7-8, SCID = 1 | 4 layers ports 7-10, SCID = 1 |
| 10 | 2 layers ports 11-12, SCID = 0 | 5 layers ports 7-11 |
| 11 | 2 layers ports 11-12, SCID = 1 | 6 layers ports 7-12 |
| 12 | 3 layers, ports 7-9 | 7 layers ports 7-13 |
| 13 | 4 layers, ports 7-10 | 8 layers ports 7-14 |
| 14 | Reserved | Reserved |
| 15 | Reserved | Reserved |

TABLE 3

Hybrid scheme

| 4-bit index | DM-RS configuration, one CW enabled | DM-RS configuration, two CW enabled |
| --- | --- | --- |
| 0 | 1 layer port 7, SCID = 0 | 2 layers ports 7-8, SCID = 0 |
| 1 | 1 layer port 7, SCID = 1 | 2 layers ports 7-8, SCID = 1 |
| 2 | 1 layer port 8, SCID = 0 | 2 layers ports 7-8, SCID = 0 (4-layer pattern ports 7-10) |
| 3 | 1 layer port 8, SCID = 1 | 2 layers ports 7-8, SCID = 1 (4-layer pattern ports 7-10) |
| 4 | 1 layer port 9, SCID = 0 | 2 layers ports 9-10, SCID = 0 (4-layer pattern ports 7-10) |
| 5 | 1 layer port 9, SCID = 1 | 2 layers ports 9-10, SCID = 1 (4-layer pattern ports 7-10) |
| 6 | 1 layer port 10, SCID = 0 | 3 layers, ports 7-9, SCID = 0 |
| 7 | 1 layer port 10, SCID = 1 | 3 layers ports 7-9, SCID = 1 |
| 8 | 2 layers ports 7-8, SCID = 0 | 4 layers ports 7-10, SCID = 0 |
| 9 | 2 layers ports 7-8, SCID = 1 | 4 layers ports 7-10, SCID = 1 |
| 10 | 2 layers ports 7-8, SCID = 0 (4-layer pattern ports 7-10) | 5 layers ports 7-11 |
| 11 | 2 layers ports 7-8, SCID = 1 (4-layer pattern ports 7-10) | 6 layers ports 7-12 |
| 12 | 2 layers ports 9-10, SCID = 0 (4-layer pattern ports 7-10) | 7 layers ports 7-13 |
| 13 | 2 layers ports 9-10, SCID = 1 (4-layer pattern ports 7-10) | 8 layers ports 7-14 |
| 14 | 3 layers, ports 7-9 | Reserved |
| 15 | 4 layers, ports 7-10 | Reserved |

TABLE 4

Two orthogonalization ports, four SCIDs, first example

| 4-bit index | DM-RS configuration, one CW enabled | DM-RS configuration, two CW enabled |
| --- | --- | --- |
| 0 | 1 layer port 7, SCID = 0 | 2 layers ports 7-8, SCID = 0 |
| 1 | 1 layer port 7, SCID = 1 | 2 layers ports 7-8, SCID = 1 |
| 2 | 1 layer port 7, SCID = 2 | 2 layers ports 7-8, SCID = 2 |
| 3 | 1 layer port 7, SCID = 3 | 2 layers ports 7-8, SCID = 3 |
| 4 | 1 layer port 8, SCID = 0 | 3 layers ports 7-9, SCID = 0 |
| 5 | 1 layer port 8, SCID = 1 | 3 layers ports 7-9, SCID = 1 |
| 6 | 1 layer port 8, SCID = 2 | 3 layers ports 8-10, SCID = 0 |
| 7 | 1 layer port 8, SCID = 3 | 3 layers ports 8-10, SCID = 1 |
| 8 | 2 layers ports 7-8, SCID = 0 | 4 layers ports 7-10, SCID = 0 |
| 9 | 2 layers ports 7-8, SCID = 1 | 4 layers ports 7-10, SCID = 1 |
| 10 | 3 layers, ports 7-9 | 5 layers ports 7-11 |
| 11 | 4 layers, ports 7-10 | 6 layers ports 7-12 |
| 12 | Reserved | 7 layers ports 7-13 |
| 13 | Reserved | 8 layers ports 7-14 |

TABLE 4-continued

Two orthogonalization ports, four SCIDs, first example

| 4-bit index | DM-RS configuration, one CW enabled | DM-RS configuration, two CW enabled |
|---|---|---|
| 14 | Reserved | Reserved |
| 15 | Reserved | Reserved |

TABLE 5

Two orthogonalization ports, four SCIDs, second example

| 4-bit index | DM-RS configuration, one CW enabled | DM-RS configuration, two CW enabled |
|---|---|---|
| 0 | 1 layer port 7, SCID = 0 | 2 layers ports 7-8, SCID = 0 |
| 1 | 1 layer port 7, SCID = 1 | 2 layers ports 7-8, SCID = 1 |
| 2 | 1 layer port 7, SCID = 2 | 2 layers ports 7-8, SCID = 2 |
| 3 | 1 layer port 7, SCID = 3 | 2 layers ports 7-8, SCID = 3 |
| 4 | 1 layer port 8, SCID = 0 | 3 layers ports 7-9, SCID = 0 |
| 5 | 1 layer port 8, SCID = 1 | 3 layers ports 7-9, SCID = 1 |
| 6 | 1 layer port 8, SCID = 2 | 3 layers ports 7-9, SCID = 2 |
| 7 | 1 layer port 8, SCID = 3 | 3 layers ports 7-9, SCID = 3 |
| 8 | 2 layers ports 7-8, SCID = 0 | 3 layers ports 8-10, SCID = 0 |
| 9 | 2 layers ports 7-8, SCID = 1 | 3 layers ports 8-10, SCID = 1 |
| 10 | 2 layers ports 7-8, SCID = 2 | 4 layers ports 7-10, SCID = 0 |
| 11 | 2 layers ports 7-8, SCID = 3 | 4 layers ports 7-10, SCID = 1 |
| 12 | 3 layers, ports 7-9 | 5 layers ports 7-11 |
| 13 | 4 layers, ports 7-10 | 6 layers ports 7-12 |
| 14 | Reserved | 7 layers ports 7-13 |
| 15 | Reserved | 8 layers ports 7-14 |

Although the embodiments described herein mainly address CoMP transmission in which multiple cells coordinate their downlink transmissions, the methods and systems described herein are not limited to CoMP applications, and can be used in a similar manner for single-cell transmission that do not involve cell cooperation.

It is noted that the embodiments described above are cited by way of example, and that the present invention is not limited to what has been particularly shown and described hereinabove. Rather, the scope of the present invention defined in the claims below includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a mobile communication terminal, receiving a Multi-User Multiple-Input Multiple-Output (MU-MIMO) signal, which comprises at least a precoded transmission that is addressed to the terminal and which comprises one or more Demodulation Reference Signals (DM-RS);
receiving, in the mobile communication terminal, control information, wherein the control information indicates one or more scrambling sequences and one or more orthogonalization sequences used in producing the DM-RS, and wherein the control information is provided in a compressed format that does not permit signaling of all possible choices of scrambling sequence and orthogonalization sequence;
interpreting the control information in the mobile communication terminal based on the compressed format so as to identify, from among all possible choices of scrambling sequence and orthogonalization sequence, the scrambling sequences and orthogonalization sequences used in producing the DM-RS; and
demodulating the DM-RS using the identified scrambling sequences and orthogonalization sequences.

2. The method according to claim 1, comprising estimating, using the demodulated DM-RS, a response of a communication channel used for transmitting the precoded transmission.

3. The method according to claim 1, wherein receiving the control information comprises receiving an indication of a subset of the orthogonalization sequences, which has been selected from an overall set of the orthogonalization sequences for use in producing the DM-RS, and wherein interpreting the control information comprises deriving the subset of the orthogonalization sequences from the indication.

4. The method according to claim 1, wherein receiving the control information comprises receiving a single indication that indicates the scrambling sequences and orthogonalization sequences used in producing the DM-RS for two different transmission ranks, and wherein interpreting the control information comprises applying the entire indication for one of the ranks, and applying a part of the indication for the other of the ranks.

5. The method according to claim 1, wherein receiving the control information comprises receiving a single indication that indicates the scrambling sequences and orthogonalization sequences used in producing the DM-RS for a first transmission rank, and wherein interpreting the control information comprises applying only a part of the indication for a second transmission rank, lower than the first transmission rank.

6. The method according to claim 5, comprising receiving data transmission on resource elements associated with a remaining part of the single indication.

7. The method according to claim 1, wherein receiving the control information comprises receiving an index that indicates a respective combination of the scrambling sequences and the orthogonalization sequences, and wherein interpreting the control information comprises identifying the scrambling sequences and orthogonalization sequences used in producing the DM-RS based on the index.

8. The method according to claim 1, wherein interpreting the control information comprises decompressing the compressed format so as to identify the scrambling sequences and orthogonalization sequences used in the DM-RS.

9. The method according to claim 1, wherein receiving the control information comprises receiving one or more port indices that are indicative of the orthogonalization sequences.

10. The method according to claim 1, wherein receiving the control information comprises receiving an indication of a given scrambling sequence that is used with two or more of the orthogonalization sequences in producing the DM-RS.

11. Apparatus, comprising:
a receiver, which is configured to receive a Multi-User Multiple-Input Multiple-Output (MU-MIMO) signal comprising at least a precoded transmission that is addressed to the terminal and which comprises one or more Demodulation Reference Signals (DM-RS), and to further receive control information, wherein the control information indicates one or more scrambling sequences and one or more orthogonalization sequences used in producing the DM-RS, and wherein the control information is provided in a compressed format that does not permit signaling of all possible choices of scrambling sequence and orthogonalization sequence; and
processing circuitry, which is configured to interpret the control information based on the compressed format so as to identify, from among all possible choices of scrambling sequence and orthogonalization sequence, the scrambling sequences and orthogonalization sequences used in producing the DM-RS, and to demodulate the DM-RS using the identified scrambling sequences and orthogonalization sequences.

12. The apparatus according to claim 11, wherein the processing circuitry is configured to estimate, using the demodulated DM-RS, a response of a communication channel used for transmitting the precoded transmission.

13. The apparatus according to claim 11, wherein the receiver is configured to receive an indication of a subset of the orthogonalization sequences, which has been selected from an overall set of the orthogonalization sequences for use in producing the DM-RS, and wherein the processing circuitry is configured to derive the subset of the orthogonalization sequences from the indication.

14. The apparatus according to claim 11, wherein the receiver is configured to receive a single indication that indicates the scrambling sequences and orthogonalization sequences used in producing the DM-RS for two different transmission ranks, and wherein the processing circuitry is configured to apply the entire indication for one of the ranks, and to apply a part of the indication for the other of the ranks.

15. The apparatus according to claim 11, wherein the receiver is configured to receive a single indication that indicates the scrambling sequences and orthogonalization sequences used in producing the DM-RS for a first transmission rank, and wherein the processing circuitry is configured to apply only a part of the indication for a second transmission rank, lower than the first transmission rank.

16. The apparatus according to claim 15, wherein the receiver is configured to receive data transmission on resource elements associated with a remaining part of the single indication.

17. The apparatus according to claim 11, wherein the receiver is configured to receive an index that indicates a respective combination of the scrambling sequences and the orthogonalization sequences, and wherein the processing circuitry is configured to identify the scrambling sequences and orthogonalization sequences used in producing the DM-RS based on the index.

18. The apparatus according to claim 11, wherein the processing circuitry is configured to decompress the compressed format so as to identify the scrambling sequences and orthogonalization sequences used in the DM-RS.

19. A mobile communication terminal comprising the apparatus of claim 11.

20. A chipset for processing signals in a mobile communication terminal, comprising the apparatus of claim 11.

* * * * *